United States Patent
Lynch et al.

(10) Patent No.: US 7,641,814 B2
(45) Date of Patent: Jan. 5, 2010

(54) LIQUID CRYSTALLINE POLYMER BARRIER RESIN FILMS AND PROCESSES THEREOF

(75) Inventors: George David Lynch, Landenberg, PA (US); Julius Uradnisheck, Glen Mills, PA (US)

(73) Assignee: E.I. du Pont de Nemours and Company, Wilmington, DE (US)

(*) Notice: Subject to any disclaimer, the term of this patent is extended or adjusted under 35 U.S.C. 154(b) by 553 days.

(21) Appl. No.: 11/475,706

(22) Filed: Jun. 27, 2006

(65) Prior Publication Data

US 2007/0003710 A1    Jan. 4, 2007

Related U.S. Application Data

(60) Provisional application No. 60/695,695, filed on Jun. 30, 2005.

(51) Int. Cl.
*C09K 19/00* (2006.01)
*C09K 19/06* (2006.01)
*C09K 19/52* (2006.01)

(52) U.S. Cl. ............... 252/299.01; 252/299.6; 252/299.62; 252/299.67; 430/20; 428/1.1; 428/1.5

(58) Field of Classification Search ............ 252/299.01, 252/299.6, 299.62, 299.67; 430/20; 428/1.1, 428/1.5
See application file for complete search history.

(56) References Cited

U.S. PATENT DOCUMENTS

| | | | |
|---|---|---|---|
| 3,778,410 A | 12/1973 | Kuhfuss | |
| 3,804,805 A | 4/1974 | Kuhfuss | |
| 4,892,912 A | 1/1990 | Hayashi | |
| 5,326,848 A | 7/1994 | Kashimura | |
| 7,105,106 B2 * | 9/2006 | Samuels et al. | 252/299.01 |
| 2004/0058092 A1 | 3/2004 | Sameuls et al. | |

OTHER PUBLICATIONS

U R Urinov, et al., Hydrodynamic and Conformational Properties of Trifluoroacetic Acid Solutions of Copolyesters Based on Poly(ethylene Terephthalate) and *p*-Hydroxybenzoic Acid, Polymer Science, Ser. B, vol. 37, No. 5-6 (1995), pp. 226-230.
PCT International Search Report for International application No. PCT/US2006/025038, dated Jan. 25, 2007.

* cited by examiner

*Primary Examiner*—Geraldina Visconti

(57) ABSTRACT

Disclosed is a single layer or multilayer polymeric structures that comprise a liquid crystalline polymer barrier resin. Such films have improved optical clarity and lower surface roughness measurements, without sacrificing desired barrier properties. These structures are useful for many packaging applications including pouches and bags and lidding applications.

14 Claims, 1 Drawing Sheet

LIQUID CRYSTALLINE POLYMER BARRIER RESIN FILMS AND PROCESSES THEREOF

The application claims priority to U.S. provisional application No. 60/695,695, filed Jun. 30, 2005, the entire disclosure of which is incorporated herein by reference.

This invention relates to single layer and multilayer structure polymer films or sheets that comprise liquid crystalline polymer barrier resin such as films or sheets comprising a liquid crystalline polymer barrier resin which exhibit improved optical clarity.

BACKGROUND

Thermotropic liquid crystalline polymers (LCPs) made from a partially aromatic polyester such as poly(ethylene terephthalate) (PET), and one or more aromatic hydroxycarboxylic acids such a p-hydroxybenzoic acid (HBA) are well known, see for instance U.S. Pat. Nos. 3,778,410 and 3,804,805.

Though U.S. Pat. No. 4,892,912 discloses the preparation of LCPs from a partially aromatic polyester, an acyloxyaromatic carboxylic acid, and a diacyloxyaromatic compound, it does not disclose use of carboxylic acid anhydrides.

U R URINOV et al., *Vysokolekulyamye Soedineniya*, Ser. B, vol. 37, (1995), pp. 262-230 describes the synthesis of LCPs from partially aromatic polyester, acetoxybenzoic acid, and diacetoxyhydroquinone in the presence of acetic acid. It does not disclose the use of carboxylic acid anhydrides.

U.S. Pat. No. 5,326,848 discloses an LCP with repeat units derived from ethylene glycol (EG), 6-hydroxy-2-naphthoic acid (HNA), p-hydroxybenzoic acid (HBA), and terephthalic acid (T). It does not disclose or suggest using a stoichiometric excess of any ingredient.

Conventional (non-LCP) copolyester resins are known that provide low melt processing temperatures, isotropic properties, and good optical properties. This class of copolyester incorporates aliphatic moieties and alicyclics and consequently they exhibit high permeation properties (>160 cm³ oxygen 25 μm/m² day atm).

Conventional LCP polyesters are known to provide good oxygen barrier properties, but they tend to be anisotropic and therefore weak in the direction transverse to melt flow, they have low elongation-to-break, and they tend to be opaque.

It would be beneficial to have an LCP barrier resin having good barrier properties, being processible at lower melt temperatures, having good optical properties or clarity for packaging applications.

SUMMARY OF THE INVENTION

The invention herein provides a film or sheet comprising an LCP barrier resin wherein the outside surface of the film or sheet demonstrates a root mean square value for surface roughness in the range of about 0.7 microns (μm) or less, when measured using an optical profilometer at a field of view of 0.72×0.54 mm and with a data density of 640 pixels in the horizontal direction and 480 pixels in the vertical direction. The LCP barrier resin comprises a polymer having repeat units of the formulae —C(O)—R¹—C(O)— (formula I); —O—R²—O— (formula II); —O—R⁴—O— (formula V); —O—Ar—C(O)— (formula IIIA); and —O—NPh-C(O)— (formula IIIB). Examples of such units are as follows:

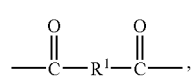  (I)

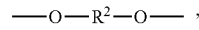  (II)

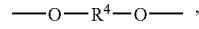  (V)

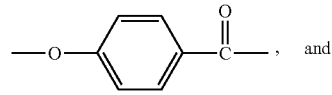  (IIIA) and

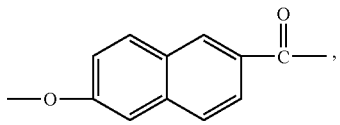  (IIIB)

wherein
from 90 to 100 mole percent of R¹ is p-phenylene, and from 0 to 10 mole percent of R¹ is m-phenylene;
from 90.0 to 100 mole percent of R² is —CH$_2$CH$_2$— and from 0 to 10.0 mole percent of R² is —CH$_2$CH$_2$OCH$_2$CH$_2$—;
each R⁴ is 4,4'-biphenylene;
(V) is from about 1 to about 3 mole percent of the total of (I) present;
the molar ratio of (I):[(II)+(V)] is about 1.0:1.0; and the total amount of the repeat unit (I+V) plus the repeat unit (I+II) is from about 25 to about 35 mole percent of said liquid crystalline polymer;
the amount of (IIIA) is from about 45 to about 55 mole percent of said liquid crystalline polymer; and
the amount of (IIIB) is from about 15 to about 25 mole percent of said liquid crystalline polymer.

Preferred is the liquid crystalline polymer above wherein
the total amount of the repeat unit (I+V) plus the repeat unit (I+II) is from about 28 to about 32 mole percent of said liquid crystalline polymer;
the amount of (IIIA) is from about 48 to about 52 mole percent of said liquid crystalline polymer; and
the amount of (IIIB) is from about 18 to about 22 mole percent of said liquid crystalline polymer. The films and/or sheets can be formed into multilayer structures, useful in articles such as pouches, bags, containers and lids for packaging applications.

The invention also includes a process for making a film or sheet of the LCP barrier resin described above. The steps involve melt processing the LCP barrier resin at a temperature above about 250° C., preferably in the range of about 255° C. to about 280° C., and more preferably in the range of about 260° C. to about 275° C., and extruding the resin onto a chill or quench roll to form a film or sheet.

BRIEF DESCRIPTION OF THE DRAWING(S)

DETAILED DESCRIPTION OF THE INVENTION

Definitions

Figure 1:
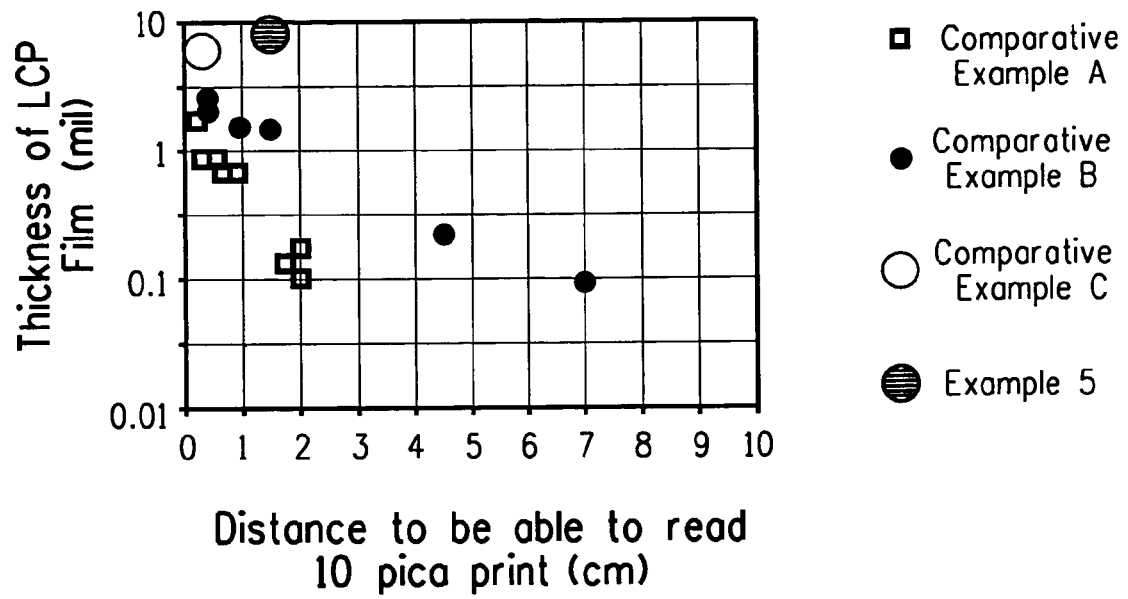
FIG. 1 is a graph depicting the thickness of various LCP barrier resin films v. the distance 10 pica print can be read.

"Copolymer" means a polymer polymerized from two or more monomers, and thereby includes terpolymers, or more precisely, a polymer containing two or more repeat units.

"Homopolymer" means a polymer polymerized from a single monomer in addition polymerizations, or from two monomers (e.g., one type of glycol and one type of diacid (or methyl ester of diacid)) in condensation polymerizations, or more precisely, a polymer containing one repeat unit.

"Liquid crystalline polymer" (LCP), is a polymer that is anisotropic when tested by the TOT test as described in U.S. Pat. No. 4,118,372, or an equivalent test.

"Hydrocarbylene" is a divalent radical containing carbon and hydrogen which has two free single bonds, these bonds being connected to a single carbon atom or two different carbon atoms.

"Saturated hydrocarbylene" is a divalent radical in which the two free single bonds are to the same or different carbon atoms, and the carbon atom(s) to which these bonds are attached are saturated, that is there are no multiple (double or triple) bonds to those carbon atoms.

"Arylene" is a divalent radical wherein each of the two free valencies is associated with a different carbon atom of one or more aromatic rings. If more than one aromatic ring is present it may be connected to other aromatic rings present as a fused ring as in naphthalene, connected by a covalent bond as in biphenyl, or connected by another group as in diphenyl ether, or any combination of these.

"Alkylene" herein is a divalent radical derived from an alkane from which two hydrogen radicals have been removed to form the alkylene radical. The two free valencies, which are single bonds, may be to the same or different carbon atoms.

"Substituted" (as in substituted hydrocarbylene, substituted arylene, etc.) is a radical that contains one or more substituent groups that are inert under the process conditions to which the compound or polymer containing these groups is subjected. The substituent groups also do not substantially interfere with the process. In a substituted radical all of the hydrogens may be replaced by substituents, as in trifluoromethyl.

"Stoichiometric excess" is an excess of a type of monomer present in a condensation polymer such as a polyester. The stoichiometric amount actually required in such a polymer is determined by the normal polymerization process and chemistry of the polymer formation. For example, when making a substantially linear polyester containing one or more diols and one or more dicarboxylic acids, normally to achieve high molecular weight polymer the total number of moles of diol(s) added to the polymerization will equal the total number of moles of dicarboxylic acid(s) added to the polymerization. If this ratio is not 1:1, then the ingredient present in the greater molar amount is present in stoichiometric excess. In particular, if the total molar amount of diol moieties is greater than the total molar amount of dicarboxylic acids, then the diol(s) are considered to be in stoichiometric excess. In such a case, the molar amount of diol(s) in stoichiometric excess may comprise a single diol or a combination of any or all of the diols present. Some types of monomers which are "self polymerizing" such as hydroxyacids in polyesters can never be present in stoichiometric excess because they contain both functional groups necessary to form the polymer.

"Containers" used herein means shaped articles suited for use in packaging or containing foods, medicines, agrochemicals, industrial liquids and the like, and the "containers" include sheets and films, as well as bottles, trays, cups, bags and like bottomed containers.

"Absence of added solvent" herein means that a compound is not added to the process solely to act as a solvent. Compounds generated within the process which may also be solvents are also not included in "added solvent". Solvents herein are used in the sense as they are described in U.S. Pat. No. 5,326,848, which is hereby incorporated by reference. Among these solvents are carboxylic acids, such as acetic acid. Specifically excluded from the class of "added solvents" are carboxylic acid anhydrides such as acetic anhydride, and carboxylic acids such as acetic which are generated by chemical reactions during the process. Such reactions include acetylation with a carboxylic acid anhydride and transesterification of carboxylate ester with a carboxylic acid to form a polymer.

"LCP barrier resin" means an LCP preferably comprising repeat units of the formulae (I), (II), (V), (IIIA), and (IIIB) disclosed and defined above.

If not otherwise stated, radicals (groups) herein may contain carbon atoms from 1 to about 30 carbon atoms.

In reference to the above-disclosed formulae, it is preferred that $R^1$ is arylene such as one or more of p-phenylene, m-phenylene, 2,6-naphthylene, or 4,4'-biphenylene. From 90 to 99.5 mole percent of $R^1$ can be p-phenylene, and 0.5 to 10 mole percent of $R^1$ can be m-phenylene. Alternatively, $R^1$ can be 100 mole percent p-phenylene.

$R^2$ is independently alkylene or substituted alkylene, or combinations thereof such as that $R^2$ is alkylene or substituted alkylene containing 2 to 10 carbon atoms in the alkylene chain. Alternatively, $R^2$ can be —$(CH_2)_n$— wherein n is an integer of 2 through 10, or n is 2, 3 or 4, or n is 2. In some syntheses of PET, some of the repeat units derived from diols are —$CH_2CH_2OCH_2CH_2$—, possibly made as the result of a side reaction in the polymerization. Alternatively, form 90.0 to 99.9 mole percent of $R^2$ can be —$CH_2CH_2$— and 0.1 to 10.0 mole percent of $R^2$ can be —$CH_2CH_2OCH_2CH_2$—.

Any $R^1$ may be combined in any way with any $R^2$ to form the partially aromatic polyester, and be present in any resulting LCP, such as poly(ethylene terephthalate) (PET). More than one polyester may be used as the partially aromatic polyester, for example a combination of PET and poly(ethylene 2,6-napthalate).

$R^3$ can be p-phenylene, m-phenylene, and 2,6-naphthylene, or combination of two or more thereof.

$R^4$ can be p-phenylene, m-phenylene, 2,6-naphthylene, 4,4'-biphenylene, 2-methyl-p-phenylene, 2-t-butyl-p-phenylene, or combination of two or more thereof.

Description

Melt-processing the LCP barrier resin can be carried out at temperatures above about 250° C., or about 255 to about 280° C., or about 260 to about 275° C. and produce films with improved optical properties result, without sacrificing other desirable film properties such as barrier and tensile properties. The optical improvement comprises enhanced visual transparency, i.e., "read-through clarity", and a reduction in haze. These LCP barrier resin films are suitable for use as single-layer films or can be laminated with other layers to form multi-layer, laminated films.

The optical improvement, clearly visible to the human eye, has proved somewhat difficult to characterize by expected ASTM methods (i.e., transparency, among others). In addition to improving the transparency, the higher melt-processing temperatures may affect the surface characteristics of the film, producing a smoother surface on the film or sheet. This is most noticeable on the outer surface of the film, i.e., the surface that does not contact a smooth, metal chill or quench roll. Differences in surface roughness have been more easily quantified, and therefore serve to document a physical difference in the films attributable to a change in the melt-processing temperature.

LCP barrier resin can be substantially amorphous, i.e., has very low levels of crystallinity, particularly when tested for a melting point by Differential Scanning Calorimetry. Often no melting endotherm is found in such analyses, which indicates no or low crystallinity.

Before formation by the article-forming process described in U.S. Patent Publication US20040058092 A1, if desired, the LCP barrier resin may be reduced in molecular weight by reaction with a monomeric functional compound, as described in U.S. Pat. No. 6,294,618, which is incorporated herein by reference.

The LCP barrier resin of the invention can be melt-processed into various shaped articles by known processes for conventional polymers and are particularly suited for forming sheets and films. Hollow shaped articles can also be produced by forming these sheets and films into tubes and sealing them longitudinally.

Films or sheets obtained from the LCP barrier resin can be made that have contact transparency when they are thin, and, for example, most such extruded films having a thickness of 25 μm or less have sufficient contact transparency. Such contact-transparent films were seldom obtainable from traditionally known liquid crystalline polyesters, but have become possible with the LCP barrier resin described herein. The invention, herein, however, improves the read-through optics even more than what was known with films of 25 μm or less. And this improvement is seen in films with higher thicknesses. Higher film thicknesses make it easier to use on multilayer film processing equipment and better ensure the barrier property capability.

The LCP barrier resin films and sheets of this invention can be made into multilayer structures with other polymers, e.g. polyolefin resins such as polyethylene, polypropylene, polyethylene-co-vinyl acetate, saponified polyethylene-co-vinyl acetate, polyethylene-co-methacrylate, polyethylene-co-methacrylic acid; polyester resins such as polybutylene terephthalate, polyethylene terephthalate copolymer and polyethylene naphthalate; polyamide resins such as nylon 66/6 copolymer; and acid copolymer and ionomers. In most cases, the LCP barrier resin films and sheets of this invention may be laminated to other layers such as sealant layers and print-layers to generate multilayer barrier films. Those resulting multilayer films may be formed into packages such as tubes, sacks or standup pouches.

Shaped articles such as tubing, film or sheets obtained from the LCP barrier resin of this invention can be heat stretched uniaxially or biaxially. In most cases the film can be heat stretched by at least 2×2 times or at least 3×3 times simultaneously or sequentially.

LCPs of this invention and LCPs produced by LCP manufacturing processes of this invention have good barrier properties to oxygen, moisture, carbon dioxide, organic liquids such as automotive fuels such as gasoline and diesel fuel, and flavors.

The LCP barrier resin films and sheets can be useful in many packaging applications. These applications include packaging a wide variety of food and beverages such as carbonated beverages, orange juice, apple juice, grape juice, other fruit juices and milk; solid foods such as meats, cheese, fish, poultry, nuts, coffee, applesauce or other sauces, stews, dried fruit, food paste, soups and soup concentrates and other edible items; spices; condiments such as ketchup, mustard, and mayonnaise; pet food; cosmetics; personal care products such as toothpaste, shaving foam, soaps, shampoos, lotions and the like; pharmaceuticals; fragrances; electronic components; industrial chemicals or household chemicals such as fragrant laundry detergent, fragrant fabric softener; agrochemicals, medical devices; medicinal liquids; fuels; and biological substances.

The containers and materials useful for the above packaging applications can be of a variety of shapes and configurations. These may include bags and pouches; caps, liners and/or lids prepared from sheets by stamping and cutting; and/or shapes prepared by folding a sheet and heat sealing its edges such as a gable-topped carton, among others.

Film Manufacture

The production of the films and/or sheets, and corresponding multi-layer film structures, can be by any such method as practiced in the art. As such, the film and film structures can be typically laminated, bonded and the like, including orientated (either uniaxially or biaxially). The film and/or sheet can be made by melting the LCP resin by using various equipment (e.g., single screw extruders, twin screw extruders, calendaring rolls, or melt gear pumps). The melted LCP resin can be formed into a melted sheet by various means such as being drawn of a calendaring roll or extruded through a slit-die. The molten sheet can be quenched to ambient temperatures on various equipment such as a single, double or triple roll quench drum or a moving quench belt such as a Sandvik Belt or other moving, quenching belt.

Films or sheets of LCP barrier resin described herein used to make a package of this invention can be either a single layer or multilayer structure, i.e., a multilayer polymeric structure or a multicomponent structure comprising polymeric and nonpolymeric materials. Any such film grade polymeric resin or material as known in the art of packaging can be employed for laminated structures in combination with thermal or solvent-based adhesives.

Multilayer films or sheets containing the LCP barrier film or sheet can be made using cold roll or heated roll lamination. For cold roll lamination the LCP barrier layer is bonded to other layers using sticky, tacky, or pressure sensitive adhesives. Such adhesives are delivered to the surface of the LCP barrier film by application during the lamination process or arrive already extrusion coated or coated to the surface to the layer to be bonded to the LCP barrier layer. Examples of such adhesives based on formulations of natural rubber, butadiene or styrene copolymer, polyisobutylene, polyethylene-vinyl acetate, or acrylics. Alternatively the adhesive may be a curable adhesive such as epoxy or cyanoacrylate which are applied to the interface of between the LCP barrier layer and other layer just prior to their being contacted in the laminator. Heated roll lamination may use similar adhesives as well as solvent based adhesives or heat activated adhesives.

Multilayer film or sheet can involve at least three categorical layers including, but not limited to, (1) an outermost structural, printable abuse layer, (2) an inner barrier layer, and (3) an innermost seal layer making contact with and compatible with the intended contents of the package and capable of forming seals necessary for enclosing the product to be contained within the package. The seals to stabilize the shape of the shaped packaging article can be formed of heat-sealable polymers. Other layers may also be present to serve as adhesive or "tie" layers to help bond these layers together.

Structural, printable or abuse layers are typically oriented polyester or oriented polypropylene, but can also include oriented polyamide. These layers are preferably reverse-printable and unaffected by the sealing temperatures used to make the package. These layers may also be made opaque by adding pigments such as titanium dioxide.

The inner barrier layer can include one or more barrier layers, depending on which atmospheric conditions (oxygen, humidity, ethylene, carbon dioxide) that potentially can affect the product inside the container, at least one of these layers can comprise the film(s) or sheet(s) comprising an LCP barrier resin. Conventional oxygen barrier layers include poly (co-ethylene/vinyl alcohol) having from about 20 to about 40 mole % ethylene ("EVOH"), poly(meta-xylylene adipamide), and polyvinylidene chloride. Whereas the gas barrier properties of both EVOH and poly(meta-xylylene adipamide) are dependent on relative humidity, LCP barrier resin is insensitive to humidity and acts as a barrier to both oxygen and moisture transmission. LCP barrier resin described herein is more thermally stable than polyvinylidene chloride (PVDC) polymer. As such, LCP barrier resin films and sheets of this invention are useful for replacing EVOH, poly(metaxylylene adipamide), or PVDC as the barrier layer in packaging applications. Other barrier layers can be, for example-metallized polypropylene (PP) or aluminum foil, silicon oxide ($SiO_x$, x between 1 and 2), alumina, carbon or composites of the same as well as related copolymers thereof. Barrier layer thickness may depend on the sensitivity of the product and the desired shelf life.

The structural and barrier layers can be interlayered to comprise several layers of polymers that provide effective barriers and bulk mechanical properties for processing and/or packaging the product, such as clarity, toughness and puncture-resistance.

In some cases, a sheet of this invention can be formed into a shaped article such as a tube, pouch, bag, cup, tub, or the like and additional closure means such as caps, lids or films may be used to complete a container and enclose the contents. In such cases, a sealant layer may not be required, or may be incorporated in the closure means.

In other cases, the multilayer structure of this invention may be a film or sheet that is sealed to itself to form a container or package of this invention. In such cases, the innermost layer of the package is the sealant. The sealant may have minimum effect on taste or color of the contents, to be unaffected by the product, and to withstand sealing conditions (such as liquid droplets, grease, dust, or the like). The sealant can be a polymeric layer or coating that can be bonded to itself (sealed) at temperatures substantially below the softening temperature of preferably the outermost layer so that the outermost layer's appearance is not affected by the sealing process and does not stick to the jaws of the sealing bar. Sealants can include ethylene polymers, such as metallocene polyethylene (mPE), or copolymers of ethylene with vinyl acetate (EVA) or methyl acrylate or copolymers of ethylene and acrylic (EA) or methacrylic acid (EMA), optionally as ionomers (i.e., partially neutralized with metal ions such as Na, Zn, or Mg). Sealants can also include polyvinylidene chloride (PVDC) or polypropylene-ethylene copolymers. Sealant layers can be from about 10 to about 60 µm thick.

The oriented polyamides can include aliphatic polyamides, amorphous polyamides, or a mixture thereof. "Aliphatic polyamides" as the term is used herein can refer to aliphatic polyamides, aliphatic copolyamides, and blends or mixtures of these. Preferred aliphatic polyamides for use in the invention are nylon 6, nylon 6,66 copolymer, blends and mixtures thereof. Uniaxially or biaxially oriented nylon 66 is particularly preferred for use in the invention. Polyamide resins such as nylon 6 and nylon 66 are commercially available under the tradename ZYTEL from E. I. du Pont de Nemours and Company (DuPont). Nylon 66 films are commercially available under the trademark "DARTEK" from DuPont.

The film may further comprise compositions containing polyamides such as those disclosed in U.S. Pat. Nos. 5,408, 000; 4,174,358; 3,393,210; 2,512,606; 2,312,966 and 2,241, 322, the disclosures of which are incorporated herein by reference.

Polyolefins can be used for the structural layers and include polypropylene or polyethylene polymers and copolymers comprising ethylene or propylene. Polyethylenes can be prepared by methods well-known in the art such as Ziegler-Natta catalyst polymerization (e.g., U.S. Pat. Nos. 4,076,698 and 3,645,992), metallocene catalyst polymerization (e.g., U.S. Pat. Nos. 5,198,401 and 5,405,922) and by free radical polymerization. Polyethylene polymers useful herein can include linear polyethylenes such as high-density polyethylene (HDPE), linear low-density polyethylene (LLDPE), and branched polyethylenes such as low-density polyethylene (LDPE). The densities of polyethylenes suitable for use in the present invention range from about 0.900 $g/cm^3$ to 0.960 $g/cm^3$. Lower densities tend to be too low to retain shape of traditional heat sealing temperatures. Linear polyethylenes for use herein can incorporate alpha-olefin comonomers such as butene, hexene or octene to modify their density within the density range so described.

Polypropylene polymers can include propylene homopolymers, impact modified polypropylene and copolymers of propylene and alpha-olefins such as PROFAX® 6323 polypropylene resin from Basell Polyolefins Inc. having an apparent melt viscosity at 100 1/s apparent shear of 550 Pa-s at 190° C. and 380 Pa-s at 230° C. and melt-point endotherm of 167° C.

The sealant layer can be an ethylene/acid copolymers ("acid copolymers") are copolymers of an olefin such as ethylene with an olefinically unsaturated organic mono- or di-acid such as acrylic or methacrylic acid, or maleic acid or fumaric acid or their anhydrides, the acid (or anhydride) comprising about 0.5 to 50 mole percent of the total polymeric material, and optionally softening monomers. The ethylene/acid copolymers and their methods of preparation are well known in the art and are disclosed in, for example, U.S. Pat. Nos. 3,264,272, 3,404,134, 3,355,319 and 4,321,337. The copolymers may be concerted to "ionomers" when the acid is neutralized in whole or in part to produce a salt. At least one or more metal cations, such as sodium, magnesium or zinc, are used to neutralize some portion of the acidic groups in the copolymer resulting in a thermoplastic resin exhibiting enhanced properties.

For example, "Ethylene/(meth)acrylic acid (E/(M)AA)" means a copolymer of ethylene (E)/acrylic acid (AA) and/or ethylene/methacrylic acid (MAA) which are at least partially neutralized by one or more alkali metal, transition metal, or alkaline earth metal cations to form an ionomer. Terpolymers can also be made from an olefin such as ethylene, an unsaturated carboxylic acid and other comonomers such as alkyl (meth)acrylates to provide "softer" resins that can be neutralized to form softer ionomers. Ionomers are well known (see, e.g., U.S. Pat. No. 3,344,014).

In addition to pressure sensitive adhesives, hot melt adhesives such as based on anhydride or acid-modified ethylene vinyl acetate co-polymers can be used as thermal adhesive layers to improve bonding of layers of polymers together when the polymers do not adhere well to each other in a lamination process, thus improving the layer-to-layer adhesion in a multilayer structure. The compositions of the tie layers may be determined according to the compositions of the adjoining layers that need to be bonded in a multilayer structure. Various tie layer compositions are commercially available such as Bynel® from DuPont. In order to not deform the LCP barrier resin of this invention during a lamination process to incorporate it into a multilayer structure, the thermal adhesive should soften at a temperature below about 80° C. Bynel® 38E536 co-extrudable adhesive, has an apparent melt viscosity at 100 1/s apparent shear of 650 Pa-s at 190° C. and 500 Pa-s at 230° C. and melting point endotherms at 50 to 72° C. The thermal adhesive could be introduced to the LCP barrier layer in a laminating process by being carried on the surface of the structural layer that is containing with the LCP barrier layer or extrusion coated on to the structural layer just prior to contacting the LCP barrier layer.

An LCP barrier resin film or sheet can also be bonded to a substrates that serve functions other than as sealants, structural layers or barrier. For example, an LCP barrier resin film or sheet may be bonded by lamination to a substrate selected from the group consisting of fabric, non-woven material, and/or a film substrate providing a washable surface such as poly(vinylidene fluoride).

Various additives known to one skilled in the art can be present in the structural film layers including plasticizers, stabilizers, antioxidants, ultraviolet ray absorbers, hydrolytic stabilizers, anti-static agents, dyes or pigments, fillers, fire-retardants, lubricants, reinforcing agents such as glass fiber and flakes, processing aids, antiblock agents, release agents, and/or mixtures thereof.

Packaging Applications

The LCP barrier resin films and sheets can be used to produce shaped articles for packaging applications, including but not limited to the following films and sheets; and containers or portions of containers formed from films or sheets:

[Note: The term "comprising" in these uses means the LCP barrier resin and/or other named ingredient(s) may be present alone or with other (unnamed) materials.]

(1) Single layer or multilayer films <about 250 μm;

(2) Single layer or multilayer sheets >about 250 μm;

In each of (1) and (2), the films or sheets may be in the form of single layers which are all or partially the LCP barrier resin films or sheets of this invention, or multilayer films, comprising one or more layers comprising LCP barrier resin films or sheets of this invention;

(3) A structure (1) or (2) containing a substrate disclosed above; selected from the group consisting of paper, paperboard, fabric, nonwoven material, and/or a film substrate comprising a polymer selected from the group consisting of poly(vinylidene fluoride), polyethylene or polyamide (nylon) 66 or 6, uniaxially or biaxially oriented polypropylene or poly(ethylene terephthalate), polylactic acid, poly(ethylene naphthalate), nylon 6 or 66;

(4) A structure (1) or (2) in which the LCP barrier resin films or sheets of this invention comprise one or both layers on the outside surfaces of the film;

(5) A structure (1) or (2) having at least one layer that has been oriented and partially heat set such that the total structure shrinks (in any direction) at least 4% when heated above 90° C.;

(6) A structure (1) or (2) that also comprises a scavenging layer which is for removing oxygen, moisture, or odors from inside the contents;

(7) A structure (1) or (2) that comprises another barrier layer such as an aluminum foil layer; vacuum deposited metal, silicon oxide, alumina, or carbon-coated film layer; polyvinylidene chloride or its copolymers; ethylene vinyl alcohol copolymer, polyvinyl alcohol, metaxylylene adipamide, aromatic nylon, or polyglycolic acid;

(8) A structure (1) or (2) that additionally comprises a pigment;

(9) A structure (1) or (2) that comprises the blister surface of blister-packs;

(10) Containers: The films or sheets may be in the form of single layers which are all or partially the LCP barrier resin films or sheets of this invention, or multilayer films, comprising one or more layers comprising LCP barrier resin films or sheets of this invention;

(11) Containers of (10) in the form of squeezable tubes, bottles, or sachets;

(12) Containers of (10) in the form of pouches or bags;

(13) Containers of (10) that are cups, trays, tubs or bowls;

(14) Containers of (10) that are retortable, steam sterilized and/or microwaveable;

(15) Containers of (10) containing fuel components such as gasoline, methane, methanol, ethanol; or solvents used as carriers for paints, insecticides, herbicides, personal care, or industrial goods.

(16) Containers formed or folded from (2) or (3) including but not limited to boxes, cartons;

(17) A component of a container (such as a cap liner, lid, or other closure);

(18) Protective coverings such as but not limited to protection of archeological specimens, paper, oxidizable metal or electronic components from oxidation or from biology that depends on oxygen;

(19) Containers of (10) that are under vacuum or contain a vacuum;

(20) Containers of (10) that contain a designed gas or gases such as used for Modified Atmosphere Packaging of food or for preserving meats;

(21) Containers of (20) that are balloons, inflatables, or pillows;

(22) Bags or pouches of (12) within a rigid container that dispense liquids such as wine, medical fluids, or baby formula;

(23) Bags lined with a structures of (1) or (2);

(24) Squeezable tubes of (11) containing foods such as but not limited to ketchup, mustard, cheese, or mayonnaise, personal care products such as but not limited to toothpaste, creams, lotions or soaps, medical or industrial materials such as but not limited to caulking or adhesive;

(25) Boxes or cartons of (17) containing orange juice, fruit juice, milk, soup, baby food, soup concentrate, soup, or pet food;

(26) Structures of (1) or (2) that wrap meats, cheese, fish, poultry, nuts, coffee, or other food;

(27) Containers of (14) containing foods such as pet food, fruits, applesauce, stews, or soups; or containing medical products;

(28) Containers of (10) containing detergents, fragrances or agrochemicals;

(29) Containers of (15) containing baby foods, relishes, ketchup, mayonnaise, mustard, vinegar, flavorings, herbs;

(30) Containers of (10) containing pharmaceuticals or medical equipment;

(31) Containers of (10) containing pet food, dried fruit, food paste, meats, or other edibles;

(32) Containers of (10) that contain pressurized products such as but not limited to beer, soda, carbonated water, shaving cream, expandable foams, insecticides.

The following examples are presented to more fully demonstrate and further illustrate various aspects of the invention and are not meant to be unduly limiting.

EXAMPLES

Polymer Preparation

Polymer was prepared for the examples and comparative examples in a manner similar to that described in U.S. Patent Publication US20040058092 A1, incorporated by reference herein. By that process, the following raw ingredients p-hydroxybenzoic acid, poly(ethylene terephthalate), 4,4'-biphenol, hydroxyl naphthoic acid and acetic anhydride were fed into an agitated reaction vessel at room temperature. The agitator was of the helical ribbon type. The reaction vessel included a Vigreaux column and reflux splitter to permit removal of by-product. The mixture was first deaerated and blanketed with nitrogen gas and then was heated to reflux at a temperature of about 170° C. by external electric heaters. The mixture was held for about an hour under total reflux to permit the acetylation of all available hydroxyl groups in the ingredients. The reaction vessel was then heated to a bath set point of 300° C. by raising the temperature slowly, i.e., approximately 20° C. every 20 minutes. During this time the reflux ratio was controlled to give approximately two-to-one reflux-to-takeoff ratio. Once evolution of acetic acid by-product slowed at the 300° C. bath set point, the Vigreaux column and reflux splitter were removed and replaced with a three-neck flask with vacuum takeoff. The flask was covered with dry ice to serve as a condenser/trap for any acetic acid removed from the reaction from this point to the end of the process. While maintaining the constant 300° C. bath temperature, the absolute pressure in the reactor and vacuum trap were reduced by about 17 kPa every 15 minutes under vacuum, until the pressure in the reactor was about 130 to 260 k Pa (abs). The pressure was held at this level for the remainder of the run. The vacuum was maintained for about 3 hours. As the torque required to turn the agitator increased, the agitator revolutions per minute (RPM) were decreased from the initial 50 RPM to a final value of 30 RPM. At the end of the three hour period the vacuum was removed, the vessel was repressurized to atmospheric pressure with nitrogen, and the polymer was recovered and quenched in water.

The resulting polymer composition is listed in Table I.

TABLE I

LCP Barrier Resin Composition

| Component (full name) | CAS# | Approximate wt % | Function |
|---|---|---|---|
| 4,4'-biphenol | 92-88-6 | 2.3 to 2.9 | comonomer |
| 4-hydroxy-benzoic acid | 99-96-7 | 41.1 to 40.8 | comonomer |
| 6-hydroxy-2-naphthalene dicarboxylic acid | 16712-64-4 | 22.4 to 22.2 | comonomer |
| PET | 25038-59-9 | 34.3 to 34 | comonomer |

The resulting LCP barrier resin had a glass transition temperature of about 75° C. but no melting point when measured by DSC. The melt viscosity at 190° C. was 3100 Pa·s at an apparent shear rate of 100 $sec^{-1}$ and 600 Pa·s at an apparent shear rate of 1000 $sec^{-1}$.

Comparative Examples

Films Produced at Melt Temperatures Below 250° C.

Comparative Example A

Cast Film

A 4-extruder multilayer film extrusion line was used to make 5-layer co-extruded film with the general structure polypropylene, co-extrudable adhesive, LCP polymer prepared as described above ("LCP barrier resin"), co-extrudable adhesive, polypropylene. The polypropylene was Profax 6323 from Basell, Inc. The co-extrudable adhesive was Bynel® 38E536 from DuPont. The polypropylene was fed from two extruders and the Bynel® extrude fed equally into the two co-extrudable layers for the resulting film. The setpoints for the extruders ranged between 215° C. and 222° C. and generated melt temperatures of about 218° C. to 227° C. Ratios for the rpm-settings for the extruders gave approximately the same ratios for the layers in the finished films. The rpm for each of the polypropylene extruders was about 110 rpm, the Bynel® extruder was running at about 30 rpm, and the "LCP barrier resin" extruder was at 20 rpm. The multilayer melt leaving the die fell about 12-cm to a nip between two quench drums. One was temperature controlled to 21° C. and the other was semi-adiabatic starting at 21° C. Thickness of the "LCP barrier resin" layer was adjusted at fixed mass throughput rate by varying the quench drum rotation speed. The cooled film was disassembled carefully to provide a monolayer of "LCP barrier resin" film. Various film thicknesses were obtained. Films are represented as squares in FIG. 1.

Comparative Example B

Blown Film

A three layer blown film of the structure polypropylene, co-extrudable adhesive and LCP barrier resin polymer prepared as described above ("LCP barrier resin") was made using an approximately 5-cm diameter multilayer blown film die on a Brampton, Inc., film extrusion system. Temperatures of the extrusion process were adjusted to 215° C. to 220° C. The melt curtain leaving the upward-die was air-quenched. Lay-flat film lengths of about 17 cm to 26 cm were achieved using various film takeoff rates of 4.5 m/minute to 9.5 m/minute. Various film thicknesses were obtained. See FIG. 1.

Comparative Example C

Cast Film—Twin Screw Extruder

This film was prepared as described for the Examples below except the polymer melt temperature was set at 225° C. See FIG. 1.

Comparative Example D

Cast Film—Twin Screw Extruder

This film was prepared as described for the Examples below except the polymer melt temperature was set at 230° C. See Tables I and II for the process parameters and film properties.

Examples

Films Produced at Melt Temperatures at or above 250° C.

Examples 1-4

LCP barrier resin films were prepared on a 28 mm twin screw extruder with a 10 inch (25.4 cm) coat hanger design die. The die gap was set at 0.0075 inches, air gap at 1.5 inches and the rate at 7.2 pounds per hour. Several take-off rates were used at temperature profiles of 260° C. with and without vacuum and pinning. (Pinning involves placing a fine wire across the chill roll without contacting the chill roll. The wire can be charged with an electrical current, which helps to improve the contact between the film web and the chill roll.)

At the 260° C. profile (275° C. melt), good quality film was obtained regardless of whether vacuum or pinning was used. However, with pinning there is generally less neck-in, and a lower chill roll temperature is required in order to prevent sticking. The tensile and haze properties are also slightly improved. When a 280° C. profile (294° C. melt) was used, the quality of the film worsened with holes developing in the melt curtain, so that temperature profile was not investigated further.

It appears that the process temperature is more closely correlated with the resulting quality and optics of the film than the chill roll temperature. The chill roll temperature is generally dependent on the process temperature anyway, so it needs to be set accordingly to ensure an initial bond of the film to the chill roll. See Tables II and III for process parameters and film properties.

TABLE II

Process Parameters

| Example | Thickness (mils) | Profile (° C.) | Melt (° C.) | Chill Roll Temp. (° C.) | Pinner Set Point | Vacuum (inches/mm Hg) | FPM |
|---|---|---|---|---|---|---|---|
| Comp. Ex. D | 1.9 | 215 | 230 | 75 | 8 | 26 | 13 |
| 1 | 0.7 | 260 | 275 | 95 | Off | Off | 32 |
| 2 | 1.3 | 260 | 275 | 95 | Off | Off | 16 |
| 3 | 2.3 | 260 | 275 | 95 | Off | Off | 8 |
| 4 | 1.1 | 260 | 275 | 95 | 8 | 29 | 16 |

TABLE III

FILM PROPERTIES

| Test Example | Direction | Modulus (psi) Mean | Modulus (psi) St. Dev. | Tensile (psi) Mean | Tensile (psi) St. Dev. | Tensile at Break (psi) Mean | Tensile at Break (psi) St. Dev. | % Elongation at Break Mean | % Elongation at Break St. Dev. |
|---|---|---|---|---|---|---|---|---|---|
| Comp. Ex. D | MD | 1643413 | 99508 | 48874 | 3517 | 48874 | 3517 | 4.9 | 0.2 |
|  | TD | 179619 | 22424 | 3701 | 484 | 3701 | 484 | 3.2 | 0.2 |
| 1 | MD | 2887016 | 217606 | 68128 | 6011 | 68128 | 6011 | 4.2 | 0.5 |
|  | TD | — | — | — | — | — | — | — | — |
| 2 | MD | 2147579 | 123768 | 65911 | 5561 | 65911 | 5561 | 6.6 | 1.0 |
|  | TD | 199505 | 18474 | 3266 | 658 | 3266 | 658 | 2.1 | 0.6 |
| 3 | MD | 1353393 | 91608 | 57242 | 6644 | 57242 | 6644 | 9.7 | 1.4 |
|  | TD | 186518 | 19672 | 3580 | 1076 | 3580 | 1076 | 2.9 | 0.9 |
| 4 | MD | 2477162 | 138537 | 72207 | 4367 | 72207 | 4367 | 6.2 | 0.7 |
|  | TD | 204763 | 2649 | 3748 | 425 | 3748 | 425 | 2.6 | 0.5 |

Example 5

Film was produced as described above for Example 4 with the exception that the melt temperature was set at 270° C.

Investigation of Optical Clarity of Experimental Films

To investigate the optical clarity of the films, the Arial Symbol (Font Size=10) "wwwwww" was observed through films of varying thicknesses from Comparative Examples A, B, C and Example 5. The maximum distance that the symbols were able to be distinguished as separate symbols was measured and recorded. The thickness of the films versus the measured distance is plotted in FIG. 1. Clearly Example 5 represents an approximately 50× increase in transparency versus comparative example films of similar thickness.

Investigate Haze Values for Experimental Films

Examples 6 and 7

Films were produced as described above for Example 4 with the exception that the melt temperature was set at 275 C.° and 250° C., respectively. The pinner was set at 8 and the vacuum was set at 26 inches.

Comparative Examples E-G

Films were produced as described above for Examples 1-4 with the exception that the melt temperature was set at 240° C., 235° C. and 225° C., respectively.

Figure 2:
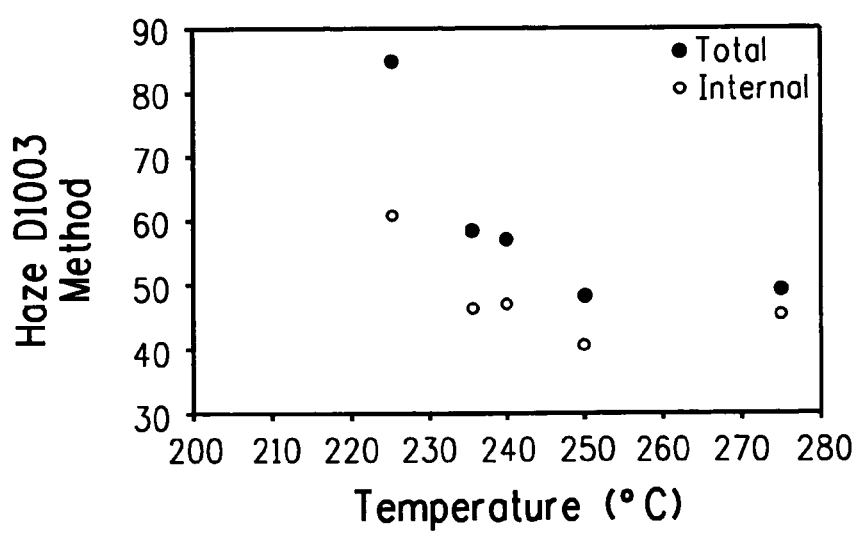
FIG. 2 is a graph depicting haze v. melt temperature for various LCP barrier resin films.

Haze, both Internal and Total, was tested per ASTM D-1003, 72° F./50% R.H., mineral oil on both sides of film, 1-inch (2.54 cm) diameter. Results are shown in FIG. 2.

Investigation of Surface Roughness Characteristics of Experimental Films

Films from Examples 7 (250° C. melt temperature) and Comparative Example G (225° C. melt temperature) were tested for Surface Roughness. Both the quench roll surface (Inside Surface) and the free surface (Outside Surface) of each film were tested. The results are shown in Table IV.

TABLE IV

|  |  | Objective and Zoom settings 5 × 0.5 | Objective and Zoom settings 20 × 0.5 | Objective and Zoom settings 50 × 0.5 | Objective and Zoom settings 50 × 2.0 |
|---|---|---|---|---|---|
|  |  | Approx. Magnification | | | |
|  |  | 25 | 100 | 250 | 1000 |
|  |  | Field of View | Field of View | Field of View | Field of View |
|  |  | 2.8 × 2.17 mm | 0.72 × 0.54 mm | 0.29 × 0.22 mm | 0.07 × 0.05 mm |
|  | Location | RMS in microns | RMS in microns | RMS in microns | RMS in microns |
| Ex. 7 | | | | | |
| Outside surface | 1 | 0.96 | 0.50 | 0.32 | 0.15 |
|  | 2 | 1.00 | 0.61 | 0.50 | 0.11 |
|  | 3 | 1.00 | 0.66 | 0.50 | 0.19 |

TABLE IV-continued

|  | Location | Objective and Zoom settings 5 × 0.5 | Objective and Zoom settings 20 × 0.5 | Objective and Zoom settings 50 × 0.5 | Objective and Zoom settings 50 × 2.0 |
|---|---|---|---|---|---|
|  |  | Approx. Magnification | | | |
|  |  | 25 | 100 | 250 | 1000 |
|  |  | Field of View | Field of View | Field of View | Field of View |
|  |  | 2.8 × 2.17 mm | 0.72 × 0.54 mm | 0.29 × 0.22 mm | 0.07 × 0.05 mm |
|  |  | RMS in microns | RMS in microns | RMS in microns | RMS in microns |
| Inside Surface | 1 | 0.98 | 0.25 | 0.24 | 0.12 |
|  | 2 | 0.81 | 0.32 | 0.21 | 0.07 |
|  | 3 | 0.61 | 0.28 | 0.16 | 0.07 |
| Comp. Ex. G |  |  |  |  |  |
| Outside Surface | 1 | 2.90 | 2.00 | 0.80 | 0.18 |
|  | 2 | 1.50 | 0.92 | 0.65 | 0.19 |
|  | 3 | 1.60 | 1.00 | 0.65 | 0.20 |
| Inside Surface | 1 | 1.50 | 0.84 | 0.61 | 0.30 |
|  | 2 | 1.70 | 0.92 | 0.55 | 0.22 |
|  | 3 | 1.30 | 0.76 | 0.42 | 0.32 |

The procedure to measure surface roughness was as follows: 307,200 data points were taken at each magnification using a grid of 640 datapoints by 480 data points (i.e., the "data density") within a given "field of view". Three-dimensional Optical Surface Profilometry was accomplished using an optical profilometer, specifically a Zygo, Inc. 5000. Scanning white-light interferometry was used to generate a three-dimensional interferogram of a surface. Interference fringes result from an optical path difference between an internal reference mirror and the sample surface. Fourier analyses was used to convert the interferograms to height at each pixel. Surface roughness, shape, step height, etc., were calculated directly from the resulting 3-D images. The height range is from approximately 1 nanometer to 5 millimeters, and the lateral range is from slightly less than a micron to centimeters, if necessary.

Root Mean Square (RMS) is well known as a fundamental measure of surface roughness amplitude. Higher RMS means that the height of bumps relative to the depths of the valleys is much greater. RMS does not show, however, the distribution or density of the bumps. That is why RMS was measured using different magnifications under the microscope. At very high magnifications, the data points are so close together that one is only looking within one bump or valley and therefore cannot detect the height or depth of other features. Hence, the RMS value drops to zero at very high magnifications.

The Outside Surface results suggest that the surface of the 225° C. melt temperature example (Comp. Ex. G) is rougher than that of the 250° C. melt temperature example (Ex. 7). The quench roll surface is generally smoother than the free surface and thus the Inside Surface results give lower RMS values.

Films were produced as described above for Ex. 4 with the exception of the melt temperature used. These films, Example 8 (250° C. melt temperature) and Comparative Example H (225° C. melt temperature), were further tested for Surface Roughness. The results were statistically analyzed and the range, mean and standard deviations calculated. The results are shown in Tables V and VI.

The testing was done using an optical profilometer, as above. A Zygo® NewView 5000 was used. Approximately 10 Zygo® areas were imaged per sample. The free surface (Outside Surface) of each film was tested. The films were tested as-is and by using a surface coating on the films to eliminate interference. The coating used was 70 nm thick gold/palladium and it was deposited using evaporative deposition. The similarity of the roughness values between the as-is and coated locations gives confidence in the as-is roughness numbers. Please note, however, that the before and after images are not in the same area and cannot be compared directly.

TABLE V

Comparative Example H

| As-is | RMS | Objective and Zoom Settings | Coated | RMS |
|---|---|---|---|---|
| Range | 0.79 | 5 × 5 | Range | 1.21 |
| Mean | 1.38 |  | Mean | 1.43 |
| Std. Dev. | 0.27 |  | Std. Dev. | 0.35 |
| Range | 0.70 | 20 × 0.5 | Range | 0.51 |
| Mean | 1.00 |  | Mean | 0.99 |
| Std. Dev. | 0.21 |  | Std. Dev. | 0.15 |
| Range | 0.32 | 50 × 0.5 | Range | 0.31 |
| Mean | 0.78 |  | Mean | 0.79 |
| Std. Dev. | 0.12 |  | Std. Dev. | 0.09 |
| Range | 0.32 | 50 × 2.0 | Range | 0.23 |
| Mean | 0.47 |  | Mean | 0.51 |
| Std. Dev. | 0.10 |  | Std. Dev. | 0.07 |

TABLE VI

Example 8

| As-is | RMS | Objective and Zoom Settings | Coated | RMS |
|---|---|---|---|---|
| Range | 0.54 | 5 × 5 | Range | 2.63 |
| Mean | 0.96 |  | Mean | 1.22 |
| Std. Dev. | 0.15 |  | Std. Dev. | 0.83 |
| Range | 0.54 | 20 × 0.5 | Range | 0.58 |
| Mean | 0.62 |  | Mean | 0.62 |
| Std. Dev. | 0.18 |  | Std. Dev. | 0.16 |
| Range | 0.63 | 50 × 0.5 | Range | 0.47 |
| Mean | 0.51 |  | Mean | 0.50 |
| Std. Dev. | 0.17 |  | Std. Dev. | 0.12 |
| Range | 1.17 | 50 × 2.0 | Range | 0.23 |
| Mean | 0.31 |  | Mean | 0.18 |
| Std. Dev. | 0.35 |  | Std. Dev. | 0.07 |

The data show that the outside surface of Example 8 was smoother than Comparative Example H at all locations and all magnifications. This was true for both the measurements of the as-is and coated surfaces.

The invention claimed is:

1. A film or sheet comprising a barrier resin wherein the outside surface of the film or sheet demonstrates a root mean square value for surface roughness in the range of about 0.7 μm or less, when measured using an optical profilometer at a field of view of 0.72×0.54 mm and with a data density of 640 pixels in the horizontal direction and 480 pixels in the vertical direction and the barrier resin comprising an LCP, which comprises or is produced from a polymer comprising repeat units of the formulae —C(O)—$R^1$—C(O)— (formula I); —O—$R^2$—O— (formula II); —O—$R^4$—O— (formula V); —O—Ar—C(O)— (formula IIIA); and —O—NPh—C(O)— (formula IIIB) wherein LCP is liquid crystalline polymer;

Ar is an arylene group;

NPh is a naphthylene group, from 90 to 100 mole percent of $R^1$ is p-phenylene, and from 0 to 10 mole percent of $R^1$ is m-phenylene;

from 90.0 to 100 mole percent of $R^2$ is —$CH_2CH_2$— and from 0 to 10.0 mole percent of $R^2$ is —$CH_2CH_2OCH_2CH_2$—;

each $R^4$ is 4,4'-biphenylene;

formula V is about 1 to about 3 mole % of the total of formula I %;

the molar ratio of formula I to the sum of formula II and formula V is about 1:1; and the total amount of the repeat unit (formula I+formula V) plus the repeat unit (formula I+formula II) is from about 25 to about 35 mole % of the LCP;

the amount of formula IIIA is from about 45 to about 55 mole % of the LCP; and the amount of formula IIIB is from about 15 to about 25 mole % of the LCP.

2. The film or sheet of claim 1 wherein the total amount of the repeat unit (formula I+formula V) plus the repeat unit (formula I+formula II) is from about 28 to about 32 mole % of the LCP.

3. The film or sheet of claim 1 wherein the amount of formula IIIA is from about 48 to about 52 mole % of said LCP.

4. The film or sheet of claim 1 wherein the amount of formula IIIB is from about 18 to about 22 mole % of the LCP.

5. The film or sheet of claim 1 wherein the sheet or film has contact or read-through clarity.

6. The film or sheet of claim 1 wherein the barrier resin is the LCP; the total amount of the repeat unit (formula I+formula V) plus the repeat unit (formula I+formula II) is from about 28 to about 32 mole % of the LCP; the amount of (formula IIIA) is from about 48 to about 52 mole % of the LCP; and the amount of (formula IIIB) is from about 18 to about 22 mole % of the LCP.

7. The film or sheet of claim 6 wherein the sheet or film has contact or read-through clarity.

8. The film or sheet of claim 6 wherein the barrier resin comprises repeat units derived from about 2.3 to about 2.9% 4,4'-biphenol, about 41.1 to about 40.8% 4-hydroxy-benzoic acid, about 22.4 to about 22.2% 6-hydroxy-2-naphthalene dicarboxylic acid, and about 34.3 to about 34% poly(ethylene terephthalate), all by weight of the resin.

9. The film or sheet of claim 8 wherein the barrier resin consisting essentially of the repeat units and the sheet or film has contact or read-through clarity.

10. The film or sheet of claim 1 having adhered or bonded thereto a substrate wherein the film or sheet is present in one or more layers of a multilayer structure; and the substrate is (1) paper, paperboard, aluminum foil, fabric, non-woven material, or combinations of two or more thereof or (2) a film substrate and the film substrate (cast or oriented), which is poly(vinylidene fluoride), nylon, polypropylene, poly(ethylene terephthalate), poly(ethylene naphthalate), polylactic acid, polyglycolic acid, poly(metaxyxyleneadipamide), cellulosic, polyvinylchloride, poly(ethylene vinyl acetate), polyvinyl alcohol, polystyrene, polycarbonate, polyimide, polyketone, copolymers with tetrafluoroethylene, polyethylene, polypropylene copolymer, polyvinylidene copolymer, polyethylene copolymer, acid copolymer, ionomer of the acid copolymer, or combinations of two or more thereof or both (1) and (2).

11. The film or sheet of claim 10 wherein the barrier resin is the LCP and the barrier resin comprises repeat units derived from about 2.3 to about 2.9% 4,4'-biphenol, about 41.1 to about 40.8% 4-hydroxy-benzoic acid, about 22.4 to about 22.2% 6-hydroxy-2-naphthalene dicarboxylic acid, and about 34.3 to about 34% poly(ethylene terephthalate), all by weight.

12. The film or sheet of claim 11 wherein the multilayer structure is in direct contact with the substrate and the sheet or film has contact or read-through clarity.

13. The film or sheet of claim 10 comprising an outermost structural layer, an inner barrier layer, and an optional innermost seal layer wherein the baffler layer comprises the film or sheet which comprises repeat units derived from about 2.3 to about 2.9% 4,4'-biphenol, about 41.1 to about 40.8% 4-hydroxy-benzoic acid, about 22.4 to about 22.2% 6-hydroxy-2-naphthalene dicarboxylic acid, and about 34.3 to about 34% poly(ethylene terephthalate), all by weight.

14. The film or sheet of claim 13 wherein the sheet or film has contact or read-through clarity and the substrate is paper, paperboard, aluminum foil, fabric, non-woven material, oriented film, cellulosic film or combinations of two or more thereof.

* * * * *

UNITED STATES PATENT AND TRADEMARK OFFICE
CERTIFICATE OF CORRECTION

PATENT NO. : 7,641,814 B2
APPLICATION NO. : 11/475706
DATED : January 5, 2010
INVENTOR(S) : Lynch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 745 days.

Signed and Sealed this

Twenty-first Day of December, 2010

David J. Kappos
*Director of the United States Patent and Trademark Office*